No. 658,861. Patented Oct. 2, 1900.
L. OLSON.
ICE OR SNOW VEHICLE.
(Application filed June 7, 1900.)
(No Model.)
Fig. 1.
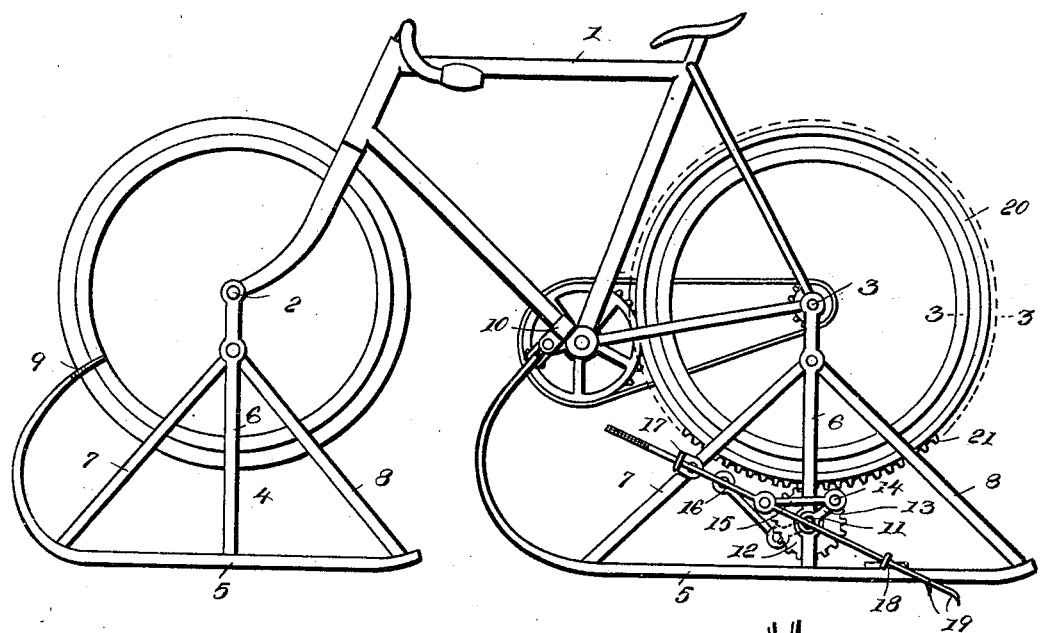
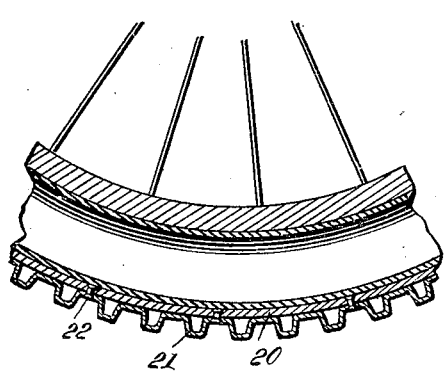
Fig. 2.
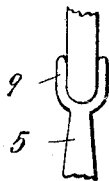
Fig. 4.
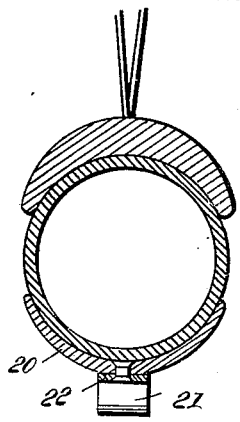
Fig. 3.
Witnesses
H. W. Riley,
T. O. McCleary
Inventor
Louis Olson,
Victor J. Evans.
By
Attorney

UNITED STATES PATENT OFFICE.

LOUIS OLSON, OF MINNEAPOLIS, MINNESOTA.

ICE OR SNOW VEHICLE.

SPECIFICATION forming part of Letters Patent No. 658,861, dated October 2, 1900.

Application filed June 7, 1900. Serial No. 19,432. (No model.)

*To all whom it may concern:*

Be it known that I, LOUIS OLSON, a citizen of the United States, residing at Minneapolis, in the county of Hennepin and State of Minnesota, have invented new and useful Improvements in Ice and Snow Vehicles, of which the following is a specification.

My invention relates to certain new and useful improvements in ice and snow vehicles; and the object of the invention is to produce a machine of this character which is propelled by manual power and is thoroughly practical and which combines in a high degree lightness, simplicity, strength, and durability of construction.

The invention contemplates the employment of a bicycle of any preferred style, in combination with supporting sleds or runners and means for imparting motion thereto. These sleds or runners, together with the motion-imparting devices, will be preferably detachably connected to the bicycle-frame, which therefore may be used, according to the season, either as a bicycle or with said attachments to form a snow or ice vehicle. Thus it is apparent that the expense of buying two complete machines is avoided.

The invention consists in novel constructions, combinations, and arrangements of parts, as will be hereinafter described.

In order that the invention may be fully understood, reference is to be had to the accompanying drawings, in which—

Figure 1 represents in side elevation a vehicle constructed in accordance with my invention. Fig. 2 represents, on an enlarged scale, a vertical section of the same and discloses more clearly the construction and arrangement of the gear-toothed band attached thereto. Fig. 3 is a transverse section on the line 3 3 of Fig. 1. Fig. 4 is a detail view, in front elevation, showing the connection between the front runner and front wheel.

In the drawings, 1 designates a bicycle-frame, 2 the front axle, and 3 the rear axle. Frames 4 are mounted upon runners 5, said frames each consisting of wheel-supporting arms 6 and braces 7 and 8, which incline from the front and rear of the runners to a meeting-point near the upper end of the wheel-supporting arms 6. The runners are semicircular in cross-section and curved upwardly at their front ends.

In securing the front runner in proper relative position to the frame the lower ends of the front fork of the bicycle-frame are fitted snugly between the supporting-arms 6. The axle 2 is then extended through the registering apertures in the arms 6 and the said fork and is engaged at its opposite ends in the customary manner by clamping-nuts. The end of the said runner terminates in a U-shaped fork, as at 9, to receive the wheel and hold the same rigid therein. The runner for the rear wheel is connected to the rear forks in like manner, except that the extremity of the curved front end of said runner extends into proximity with the lower brace-bar of the bicycle-frame and is pivotally secured thereto by suitable clamping means 10.

Journaled in the wheel-supporting arms of the rear sled is a short transverse shaft 11, carrying a pinion 12, arranged between said arms and adapted to be driven by means hereinafter described. The shaft 11 extends beyond the supporting-arms 6 and has secured to each extremity thereof a short crank 13, the said cranks being out of alinement with each other to prevent dead-centering and pivotally connected at their outer ends as at 14, to links 15, which are in turn pivotally connected to the push-bars 16. Said push-bars 16 are arranged at an acute angle to the plane of the runner, and are mounted in suitable guides 17 and 18, preferably secured to the runner and the front supporting-arm, respectively.

The push-bars are preferably formed of steel or other strong metal and are pointed at their ends and preferably have their points turned downward, forming spurs 19, so as to readily penetrate the ice or snow.

In order to impart motion to the pinion 11, the rear wheel of the bicycle is provided with a peripheral steel band 20, preferably semicircular in cross-section and provided with gear-teeth 21, adapted to mesh with the teeth of the pinion 11. The teeth 21 are of peculiar construction, being formed of a flat band bent or pressed into suitable shape and riveted or otherwise secured to the exterior face of the band 20, as at 22, thereby forming a very light, yet strong and durable, gear. The attaching rim or band 20 is semicircular in cross-section or gutter-shaped to receive and conform to the tire of the wheel when inflated, thereby securing itself thereto without the employment of objectional retaining devices.

The rear wheel is driven in the usual manner.

In attaching the band 20 to the wheel the operation is as follows: The tire being deflated the rim is then placed in its position, after which the tire is again inflated, thereby causing the rim to fit tightly and snugly thereon.

The operation of the foregoing mechanism is as follows: When the pedals of the bicycle are rotated by the rider, motion is imparted through the rear wheel and the pinion 12 to the shaft 11, causing said shaft to revolve. The rotary motion of said shaft is converted, by means of the crank 14 and link 15, to a reciprocating motion upon the part of the push-bars, which are alternately projected and retracted, engaging the snow or ice at each stroke, and so propelling the vehicle.

From the foregoing it will be seen that in a vehicle of this character one is enabled to produce an ice or snow vehicle of great simplicity and efficiency by virtue of the arrangement of the push-rods to reciprocate at a proper and unchangeable inclination, thereby producing the most direct application of the propelling force, and, further, by the novel conversion of the rear wheel of the bicycle into a driving gear through the agency of a toothed rim readily attachable to the same, thus obviating the necessity of removing the rear wheel of the bicycle and substituting therefor a separate gear or other mechanism, as found in devices of this character.

I claim—

1. An ice or snow vehicle comprising a bicycle, frames secured to the axles of the bicycle, runners secured to said frames, push-rods supported on opposite sides of the rear-runner frame, and means for reciprocating the push-rods, consisting of a toothed band on the rear wheel, a shaft mounted upon the rear-runner frame, a gear-pinion on said shaft, cranks on the ends of said shaft, and links connecting said cranks and push-rods.

2. In an ice and snow vehicle comprising a pair of runners, frames mounted thereon, consisting of upright wheel-supporting arms and inclined braces, a short shaft journaled in the wheel-supporting arm, a pinion mounted on said shaft, cranks secured to the ends of the shaft, a pair of push-rods, and link connections between the cranks and push-rods, said push-rods being secured in brackets at an angle to the runners.

3. The combination with a bicycle; of a band fitting upon the rear wheel thereof and having gear-teeth, runner-frames secured to the axles of the bicycle, runners suspended by said frames, a shaft mounted in bearings in the rear-runner frame, a gear-pinion on said shaft meshing with the teeth on the band, cranks on said shaft, push-rods supported on opposite sides of the rear-runner frame at an angle to the runner, and links connecting said crank and push-rods.

4. In a snow and ice vehicle comprising a bicycle and detachable runners, the combination with the rear wheel of the bicycle; of a curved band fitting the periphery of the wheel, a supplemental band formed with gear-teeth secured to said curved band, push-rods in the rear-runner frame, and mechanism driven by the gear-teeth on the rear wheel for reciprocating said push-rods.

In testimony whereof I affix my signature in presence of two witnesses.

LOUIS OLSON.

Witnesses:
J. R. CLUTH,
OTTO ROOD.